United States Patent [19]

Bedrosian et al.

[11] 4,079,152

[45] Mar. 14, 1978

[54] CONTROLLED ATMOSPHERE TOMATO PACKAGE

[76] Inventors: Karakian Bedrosian, Sherwood Ct., Alpine, N.J. 07620; Robert F. Schiffmann, 149 W. 88th St., New York, N.Y. 10024

[21] Appl. No.: 749,063

[22] Filed: Dec. 9, 1976

Related U.S. Application Data

[63] Continuation of Ser. No. 556,630, Mar. 10, 1975, abandoned.

[51] Int. Cl.² .............................................. B65B 25/04
[52] U.S. Cl. .................................... 426/124; 426/415
[58] Field of Search .............. 426/106, 118, 124, 324, 426/323, 395, 410, 415, 418, 419, 398

[56] References Cited

U.S. PATENT DOCUMENTS

| | | | |
|---|---|---|---|
| 2,524,162 | 10/1950 | Chavannes et al. | 426/124 X |
| 2,548,780 | 4/1951 | Gary et al. | 206/204 |
| 2,838,403 | 6/1958 | Notter | 426/398 |
| 3,102,777 | 9/1963 | Bedrosian et al. | 426/419 |
| 3,450,544 | 6/1969 | Badran et al. | 426/415 |
| 3,507,667 | 4/1970 | Magnen | 426/419 |
| 3,630,759 | 12/1971 | Rumberger | 426/415 X |
| 3,761,289 | 9/1973 | Wolf | 426/118 |
| 3,795,749 | 3/1974 | Cummin et al. | 426/415 X |
| 3,804,961 | 4/1974 | Cummin et al. | 426/415 |

FOREIGN PATENT DOCUMENTS

| | | | |
|---|---|---|---|
| 2,020,563 | 1/1971 | Germany | 426/323 |
| 7,410 of | 1911 | United Kingdom | 426/419 |
| 691,682 | 5/1953 | United Kingdom | 426/419 |
| 1,242,412 | 8/1971 | United Kingdom | 426/419 |

OTHER PUBLICATIONS

Food Engineering 7/51 pp. 38, 39, 147.

*Primary Examiner*—Steven L. Weinstein
*Attorney, Agent, or Firm*—Amster & Rothstein

[57] ABSTRACT

A controlled atmosphere package for retarding the ripening rate of tomatoes is formed from a gas permeable film which allows the tomatoes to convert the package atmosphere to an environment containing 0 to 10 vol.% carbon dioxide and 2.5 to 10 vol.% oxygen. The package contains chemical agents capable of absorbing moisture and carbon dioxide from the package environment so as to prevent mold growth or injury to the tomatoes.

9 Claims, No Drawings

CONTROLLED ATMOSPHERE TOMATO PACKAGE

This is a continuation, of application Ser. No. 556,630 filed Mar. 10, 1975, now abandoned.

This invention is directed to a system for retarding the ripening process of fruits and vegetables. More particularly, this invention relates to a controlled atmosphere package for tomatoes.

Maintaining the flavor, texture and eating qualities of fresh fruits and vegetables, such as tomatoes, from the time of harvest through the time of purchase and actual consumption has been a problem of long-standing duration. The most common technique for preventing tomatoes from reaching an over-ripe state has been to pick the fruit in a relatively green state and retard the ripening process by the use of refrigeration. It is well-known in the art, however, that tomatoes are very sensitive to low temperatures and in fact are physiologically injured if they are exposed to temperatures below 55° F. The injury manifests itself in a loss of flavor, a breakdown of cellular structure and in later stages, rotting of the fruit.

It is known in the art that the ripening process of fruits and vegetables can be retarded by controlling the atmosphere surrounding the fruit, i.e., reducing the amount of oxygen and increasing the amount of carbon dioxide in the atmosphere. See for example, Bedrosian, et al., U.S. Pat. No. 3,102,777. Moreover, it has been suggested that the ripening process of fruits such as tomatoes or bananas, can be partially or completely retarded by packaging the fruit in plastic films having pre-selected permeability rates with respect to oxygen and carbon dioxide. See Badran, U.S. Pat. No. 3,450,542 and Cummin, et al., U.S. Pat. No. 3,804,961. These techniques have not met with widespread acceptance, at least in part due to injury to fruit as a result of carbon dioxide absorption and moisture accumulation which sometimes lead to mold growth, and also because they have either completely retarded the ripening process or have required initial evacuation or treatment of the package environment.

It is an object of the present invention to provide a controlled atmosphere package for fruits and vegetables and particularly tomatoes.

It is another object of this invention to provide a controlled atmosphere package for tomatoes capable of controlling the ripening rate of tomatoes, without refrigeration, irrespective of the variety, geographic origin or state of maturity of the tomatoes at the time of packaging.

Yet another object of the invention is to provide a package for tomatoes which controls the ripening rate of the fruit without the formation of mold growth on the fruit or injury to the fruit as a result of carbon dioxide absorption and moisture accumluation.

The above objects of the invention are accomplished by providing a package comprising a sealed enclosure formed, at least in part, of a gas permeable film which will allow the tomatoes in the package to convert the air originally present in the package to an environment that contains 0 to 10 vol.% $CO_2$ and 2.5 to 10 vol.% $O_2$, which package additionally contains chemical agents to reduce the moisture and carbon dioxide levels in the package atmosphere to levels which will not favor the formation of mold growth or injury to the fruit. Packages formed in accordance with the invention are capable of limiting the ripening rate of tomatoes to a one-stage increase in maturation development over a seven day period at room temperature. In contrast, tomatoes left in the air at room temperature will exhibit a one-stage increase in maturation development each day or two and tomatoes maintained at the minimum recommended storage temperature of 56° F. in air will exhibit a two-stage increase in maturation development in a seven day period.

The composition and thickness of the films which may be employed to form the controlled atmosphere package of the invention are not critical, the sole essential requirement being that the film have sufficient oxygen and carbon dioxide permeability to permit the packaged fruit to convert the air, i.e. ambient atmosphere, originally present in the package to an environment which contains 2.5 to 10% oxygen and 0 to 10% carbon dioxide. A preferred film is low density polyethylene having an oxygen permeability rate in the range of 75 to 3000 cc/100 sq.in./day, e.g., 2800 cc/100 sq.in./day and a $CO_2$ permeability rate in the range of 500 to 15,000 cc/100 sq.in./day, e.g., 1900 cc/100 sq.in./day. It will be obvious to those persons skilled in the art that the thickness of the film layer is not critical so long as it is maintained within a range which will achieve the desired permeability characteristics and provide sufficient strength to avoid rupture during normal shipping and handling of the package. In the case of the preferred low density polyethylene, a film thickness of 1.0 to 2.5 mils has been found suitable.

Other films having permeability rates which render them suitable for use in the packages of the invention are polyvinyl chloride and polypropylene.

The form of the package or container constructed from the gas permeable film is not critical. Accordingly, the film may be formed into a bag which can be sealed or tied by any conventional means which serves to isolate the package environment from the ambient environment. Alternatively, the film may be used in the form of a wrap for a tray or container which holds the fruit. Irrespective of the form of the package, no steps need be taken to evacuate or otherwise modify the package environment during the initial packaging of the fruit. Modification of the package environment results solely from the equilibrium achieved by the respiration of the fruit and the permeability of the packaging film such that the percentage of oxygen and carbon dioxide is maintained within the previously stated limits.

It has been discovered that due to the permeability of the films used to form the packages of the invention, undesirable amounts of water vapor will accumulate within the package environment. The presence of this water vapor stimulates mold growth, particularly in the stem end area of the fruit. Accordingly, it is an important feature of the present invention to include a desiccant within the package. Any known material suitable of absorbing moisture, such as lithium chloride, ethylene glycol, silica gel, calcium chloride, activated alumina, calcium sulfate, or magnesium perchlorate may be employed. The use of calcium chloride crystals is preferred.

Although the calcium chloride desiccant may be simply dispersed within the package for the purpose of absorbing water vapor, that approach is not preferred since, unless large amounts of the desiccant are employed, a calcium chloride solution will ultimately form which would coat the fruit and render it unacceptable. Accordingly, in accordance with the present invention, the desiccant is inserted in the package in a sealed packet formed from a film which is permeable to water vapor but which will retain any solution formed within the packet, thereby keeping such solution out of contact with the fruit contained within the package. Suitable films for this purpose include uncoated cellophane film, a film sold by E. I. duPont de Nemours & Co. under the trademark "Tyvek", which is a co-extruded film formed from polyethylene and paper, micropore polypropylene or wet strengthened paper. The use of an integral film packet offers a further advantage in that the solution of calcium chloride which will form after the calcium chloride has absorbed its weight in water will continue to absorb further amounts of water vapor, thereby reducing the quantity of desiccant which must be employed. Obviously, the amount of desiccant employed is not critical provided that an amount sufficient to prevent mold growth is employed. When calcium chloride is employed as a desiccant for tomatoes packaged in accordance with the invention, 1 to 10 grams of calcium chloride per pound of tomatoes, e.g. 5 grams/lb. tomatoes has been found to be sufficient to retard the formation of mold for 14 - 21 days.

The ratio between the surface area of film used to form the package and the weight of tomatoes or other fruit contained within the package is not critical and may vary widely while still achieving the desired oxygen and carbon dioxide environment within the package. However, as the fruit-to-film area ratio is increased, higher carbon dioxide levels and lower oxygen levels within the package environment will be achieved. Typical ratios when employing a polyethylene film may be in the range of 0.01 to 0.10 pounds of tomatoes per square inch of film, e.g. 0.03 pounds of tomatoes per square inch of film.

Although low oxygen levels in the range of 2.5 to 5.0% and high carbon dioxide levels, in the range of 5 to 10%, are desirable from the standpoint of maximum inhibition of the ripening process of the fruit, such $CO_2$ levels may physically injure the tomatoes, particularly those varieties of tomatoes having a high degree of sensitivity to carbon dioxide. It is another feature of the present invention to include a carbon dioxide absorbent within the package environment in an amount sufficient to keep the carbon dioxide level of that environment below 2.5%. Suitable carbon dioxide absorbents include silica gel, charcoal, lithium chloride and preferably lime. The use of 2 to 20 grams, e.g. 5 grams, of hydrated lime per pound of tomatoes will maintain the desired carbon dioxide level for up to 14 days at room temperature. In a preferred embodiment of the invention, the carbon dioxide absorbent is contained within the sealed desiccant packet so as to avoid any direct contact with the fruit.

The invention will be further understood by reference to the following illustrative examples:

EXAMPLE 1

20 pounds of tomatoes were placed in low density polyethylene bags and the packages were sealed to the outside atmosphere by use of a twist-tie. No steps were taken to modify the package environment prior to sealing the bags and the bags were maintained at room temperature. The carbon dioxide and oxygen content of the bags was measured at various intervals as set forth in Table I.

Table I

| Time From Packaging (Hours) | $CO_2$ Content | $O_2$ Content |
|---|---|---|
| 1.0 | 1.7% | 18.7% |
| 2.5 | 3.6 | 17.0 |
| 4.0 | 4.0 | 13.9 |
| 5.5 | 5.3 | 12.7 |
| 7.0 | 6.0% | 11.2% |
| 9.5 | 7.1 | 9.2 |
| 11.0 | 9.6 | 8.0 |
| 15.0 | 11.1 | 7.4 |
| 18.0 | 9.8 | 9.8 |
| 21.0 | 8.6 | 4.4 |
| 29.0 | 8.4 | 4.6 |
| 38.0 | 7.7 | 4.8 |
| 48.0 | 7.6 | 4.9 |
| 72.0 | 7.7 | 5.0 |
| 96.0 | 7.5 | 4.9 |

As can be seen from the data in Table I, the tomatoes began to modify the environment of the package within the first hour and the peak carbon dioxide levels were reached approximately 15 hours after packaging. The carbon dioxide level thereafter began to decrease as a result of the reduction in the respiration rate of the fruit under the new environmental conditions within the package. The oxygen level within the package reached a minimum approximately 21 hours after packaging and then began to gradually increase. The increase in the oxygen level, like the decrease in the carbon dioxide level, is clearly due to a decrease in the respiration rate of the tomatoes. It is apparent from the data in Table I that the atmosphere of the package achieved an equilibrium with the carbon dioxide and oxygen permeability rates of the film after approximately 38 hours from the time of closing the package. The achievement of this equilibrium is critical to the invention since, if equilibrium was not attained, the oxygen level would go to zero, thereby resulting in damaged tomatoes. The relatively constant carbon dioxide and oxygen content of the environment from and after 38 hours from the time of packaging clearly indicates that the consumption of oxygen by the fruit is roughly equivalent to the oxygen permeability of the film and the carbon dioxide evolved by the fruit as a result of respiration is roughly equivalent to the carbon dioxide permeability of the film.

EXAMPLE 2

Packages were prepared by placing two pounds of tomatoes in a series of polyethylene bags which were identical with the exception that one group of bags was formed from a polyethylene film having a thickness of 1.25 mils, and the second group of bags was formed from a polyethylene film having a thickness of 2.5 mils. The bags were sealed from the environment with twist-ties and left at room temperature under identical conditions. The carbon dioxide and oxygen content of the two package environments was measured at various intervals and the results are reported to Table II:

Table II

| Time From Pack | $CO_2$ Content | | $O_2$ Content | |
|---|---|---|---|---|
| | 1.25 mil | 2.50 mil | 1.25 mil | 2.50 mil |
| 21 hrs. | 6.2% | 8.6% | 8.0% | 4.2% |
| 45 hrs. | 5.0% | 7.8% | 8.8% | 4.6% |
| 68 hrs. | 4.6% | 5.8% | 9.0% | 5.8% |

The results of these experiments indicate that the thicker film provides a lower oxygen level and a higher carbon dioxide level than the thinner polyethylene film, thereby indicating that the permeability of the film is affected by the film thickness.

EXAMPLE 3

The effect of the fruit weight-to-film area ratio was determined by packaging different weights of tomatoes in two identical polyethylene bags, sealing the bags with ties, and leaving the bags at room temperature under identical conditions. The results of analysis of the package environments at various intervals is reported in Table III below:

Table III

| Time From Pack | $CO_2$ Content | | $O_2$ Content | |
|---|---|---|---|---|
| | 0.0124lbs/in$^2$ | 0.0311lbs/in$^2$ | 0.0124lbs/in$^2$ | 0.0311lbs/in$^2$ |
| 21 hrs. | 6.2% | 8.6% | 8.0% | 4.4% |
| 45 hrs. | 5.0% | 7.6% | 8.8% | 4.9% |
| 68 hrs. | 4.6% | 7.7% | 9.0% | 5.0% |

The results of this experiment illustrate that as the amount of fruit per unit area of film is increased, higher carbon dioxide levels and lower oxygen levels are achieved within the package environment.

EXAMPLE 4

2 pounds of tomatoes in green, light pink, and light red stages of maturity were packaged in polyethylene packages and stored at room temperature. Control tomatoes of the same maturity were stored in air. Color development in the tomatoes occurred as follows:

| | TIME (DAYS) | | | | |
|---|---|---|---|---|---|
| | 1 | 3 | 5 | 7 | 9 |
| green-air | green | breaking | turning | light pink | light red |
| green (packaged) | green light pink | green light red | green light red | green soft ripe | breaking soft ripe |
| light pink (air) | pink | red | red | | |
| light pink (packaged) | light pink | light pink | light pink | pink | pink |
| light red (air) | light red | light red | light red | soft ripe | soft ripe |
| light red (packaged) | red | red | red | firm red | firm red |

The results of this experiment show that regardless of the initial maturity of the fruit, packaging in a controlled atmosphere environment significantly slows down the ripening process over what would have occurred if the fruit were left in the air.

EXAMPLE 5

A 2 pound sample of green, light pink, and light red tomatoes was packaged in polyethylene packages and stored at room temperature. One set of sample had 10 grs $CaCl_2$ desiccant packaged in a 3 inches × 4 inches Tyvek pouch, and the controls did not. The results after 10 days were as follows:

| | % Sample Showing Gray Mold | |
|---|---|---|
| Initial Maturity | with $CaCl_2$ Present | Control |
| green | 0.0 | 35% |
| light pink | 0.0 | 42% |
| light red | 0.0 | 40% |

The results from this experiment clearly show that a desiccant reduces the moisture level in the polyethylene package atmosphere to a level which inhibits mold growth.

EXAMPLE 6

A 2 pound sample of green, light pink, and light red tomatoes was packaged in polyethylene packages and stored at room temperature. One set of the sample had 20 grs of lime and 10 grs of $CaCl_2$ packaged in 3 inches × 4 inches Tyvek pouches, and the controls had only 10 grs $CaCl_2$ in the Tyvek pouches. The results after 10 days of storage were as follows:

| | % Sample Showing $CO_2$ Injury | |
|---|---|---|
| Initial Maturity | Lime and $CaCl_2$ | $CaCl_2$ |
| green | 0.0 | 65% |
| light pink | 0.0 | 53% |
| light red | 0.0 | 50% |

$CO_2$ injury manifests itself in surface blemishes, brown staining, uneven coloration, increased softening, and increased susceptibility to decay. The $CO_2$ level in the pouches with lime and $CaCl_2$ present did not exceed 1.1%, whereas the pouches containing $CaCl_2$ only averaged $CO_2$ levels of 4.3 to 7.5%.

What is claimed is:

1. A tomato package comprising a sealed enclosure containing a quantity of tomatoes, said tomatoes being of any state of maturity, the initial atmosphere within said sealed enclosure having been established by sealing the enclosure from the outside ambient atmosphere without modification of the ambient atmosphere within the enclosure, said enclosure being formed from a gas permeable film having an oxygen permeability in the range of 75 to 3,000 cc/100 sq. inches/day and a carbon dioxide permeability of 500 to 15,000 cc/100 sq. inches/day, a sealed packet within said enclosure, said packet containing a quantity of a desiccant material, the amount of said desiccant material being sufficient to retard the formation of mold on the tomatoes within said sealed enclosure for a period of 14 to 21 days, said packet being formed from a film which is permeable to water vapor but which will retain any solution formed in said packet, said enclosure further including a quantity of a carbon dioxide absorbent within said enclosure sufficient to maintain the carbon dioxide content of the environment within said enclosure below 2.5 vol.%, the initial atmosphere within said enclosure being converted to an atmosphere which results solely from the equilibrium achieved by the respiration of said tomatoes, the gas permeability of said film, said desiccant and said carbon dioxide absorbent.

2. The package of claim 1, wherein said packet is formed from uncoated cellophane.

3. The package of claim 1, wherein the gas permeable film is low density polyethylene.

4. The package of claim 3, wherein said film has a thickness of 1.0 to 2.5 mils.

5. The package of claim 1, wherein said desiccant is calcium chloride.

6. The package of claim 5 containing 1 to 10 grams of calcium chloride per pound of tomatoes in said enclosure.

7. The package of claim 1, wherein said carbon dioxide absorbent is lime.

8. The package of claim 7 containing 2 to 20 grams of lime per pound of tomatoes in said enclosure.

9. The package of claim 7, wherein said carbon dioxide absorbent material is contained within said packet.

* * * * *